US010872419B2

(12) United States Patent
Zhao et al.

(10) Patent No.: US 10,872,419 B2
(45) Date of Patent: Dec. 22, 2020

(54) METHOD AND APPARATUS FOR EVALUATING A VEHICLE TRAVEL SURFACE

(71) Applicant: GM Global Technology Operations LLC, Detroit, MI (US)

(72) Inventors: Qingrong Zhao, Madison Heights, MI (US); Mohsen Khalili, Sterling Heights, MI (US); Bakhtiar B. Litkouhi, Washington, MI (US); Jingfu Jin, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 179 days.

(21) Appl. No.: 16/120,616

(22) Filed: Sep. 4, 2018

(65) Prior Publication Data
US 2020/0074639 A1   Mar. 5, 2020

(51) Int. Cl.
*G06T 7/194* (2017.01)
*G06T 1/00* (2006.01)
(Continued)

(52) U.S. Cl.
CPC .............. *G06T 7/194* (2017.01); *B60W 40/06* (2013.01); *G06T 1/0007* (2013.01); *G06T 7/40* (2013.01);
(Continued)

(58) Field of Classification Search
CPC .......... B60W 40/06; G06T 7/194; G06T 7/40; G06T 7/90
See application file for complete search history.

(56) References Cited

U.S. PATENT DOCUMENTS 5,752,214 A * 5/1998 Minowa ................ B60W 40/06
    701/111
5,987,174 A * 11/1999 Nakamura ......... G06K 9/00798
    382/104

(Continued)

FOREIGN PATENT DOCUMENTS

JP    04263400 A  *  9/1992

OTHER PUBLICATIONS

Shibata, Takeuch, Kawai, Horita; "Detection of Road Surface Conditions in Winter using Road Surveillance Cameras at Daytime, Night-time and Twilight"; IJCSNS International Journal of Computer Science and Network Security, vol. 14 No. 11, Nov. 2014, pp. 21-24.

(Continued)

*Primary Examiner* — Gandhi Thirugnanam
(74) *Attorney, Agent, or Firm* — Quinn IP Law

(57) ABSTRACT

A vehicle subsystem includes an on-vehicle camera that is disposed to monitor a field of view (FOV) that includes a travel surface for the vehicle. A controller captures, via the on-vehicle camera, an image file associated with the FOV and segments the image file into a first set of regions associated with the travel surface and a second set of regions associated with an above-horizon portion. Image features on each of the first set of regions and the second set of regions are extracted and classified. A surface condition for the travel surface for the vehicle is identified based upon the classified extracted image features from each of the first set of regions and the second set of regions. Operation of the vehicle is controlled based upon the identified surface condition.

17 Claims, 6 Drawing Sheets

(51) Int. Cl.
  *G06T 7/40* (2017.01)
  *G06T 7/90* (2017.01)
  *B60W 40/06* (2012.01)

(52) U.S. Cl.
  CPC ........... *G06T 7/90* (2017.01); *B60W 2420/42* (2013.01); *B60W 2552/00* (2020.02); *B60W 2556/55* (2020.02); *B60W 2556/60* (2020.02); *G06T 2207/30256* (2013.01)

(56) References Cited

U.S. PATENT DOCUMENTS

| | | | | |
|---|---|---|---|---|
| 6,254,259 | B1* | 7/2001 | Kobayashi | B60Q 1/085 340/459 |
| 6,405,128 | B1* | 6/2002 | Bechtolsheim | G01C 21/3667 340/988 |
| 9,139,204 | B1* | 9/2015 | Zhao | G01C 21/00 |
| 10,558,868 | B2* | 2/2020 | Zhao | G06K 9/00798 |
| 2007/0263090 | A1* | 11/2007 | Abe | H04N 5/235 348/148 |
| 2009/0041303 | A1* | 2/2009 | Aoki | G06T 7/73 382/104 |
| 2011/0074955 | A1* | 3/2011 | Kuehnle | G06K 9/00798 348/148 |
| 2012/0147187 | A1* | 6/2012 | Li | G06K 9/3233 348/148 |
| 2013/0027511 | A1* | 1/2013 | Takemura | G06K 9/00805 348/42 |
| 2013/0191070 | A1* | 7/2013 | Kainer | B61K 9/00 702/167 |
| 2013/0266226 | A1* | 10/2013 | Zhang | G06K 9/00791 382/195 |
| 2015/0049193 | A1* | 2/2015 | Gupta | H04N 17/002 348/148 |
| 2015/0178572 | A1* | 6/2015 | Omer | G08G 1/0141 382/108 |
| 2015/0178588 | A1* | 6/2015 | Fischer | G06K 9/4661 382/103 |
| 2015/0212199 | A1* | 7/2015 | Nakamura | G01S 13/89 342/118 |
| 2015/0284008 | A1* | 10/2015 | Tan | B60W 30/12 701/28 |
| 2015/0371095 | A1* | 12/2015 | Hartmann | G06K 9/00476 348/148 |
| 2016/0167669 | A1* | 6/2016 | Zhao | G06K 9/00791 382/195 |
| 2018/0009441 | A1* | 1/2018 | Valois | G05D 1/0231 |
| 2019/0188495 | A1* | 6/2019 | Zhao | G06K 9/627 |
| 2019/0250630 | A1* | 8/2019 | Zhao | G06T 7/62 |
| 2020/0074639 | A1* | 3/2020 | Zhao | G06T 7/40 |

OTHER PUBLICATIONS

Zhao, Khalili, Wang, Litkouhi; Utility U.S. Appl. No. 15/896,104, filed Feb. 14, 2018.

* cited by examiner

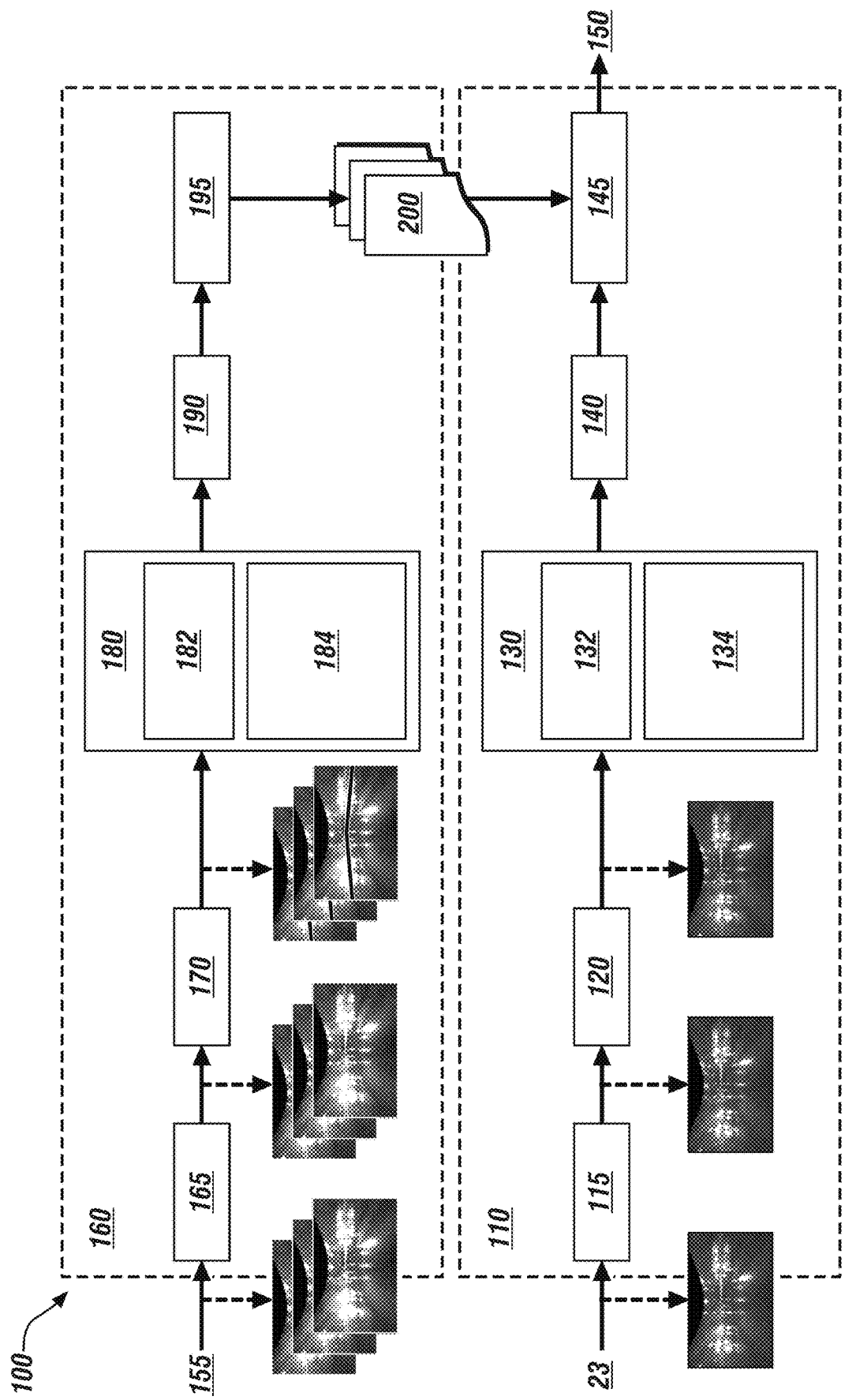

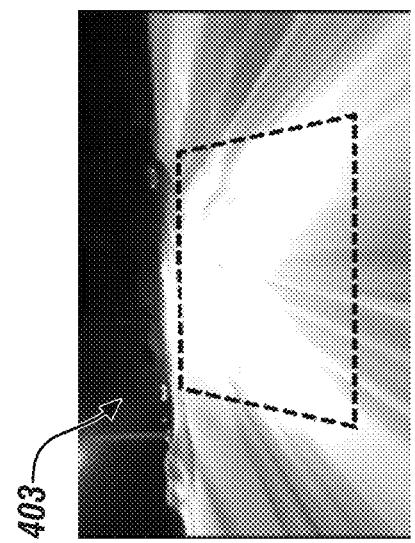
FIG. 4-1
FIG. 4-2
FIG. 4-3
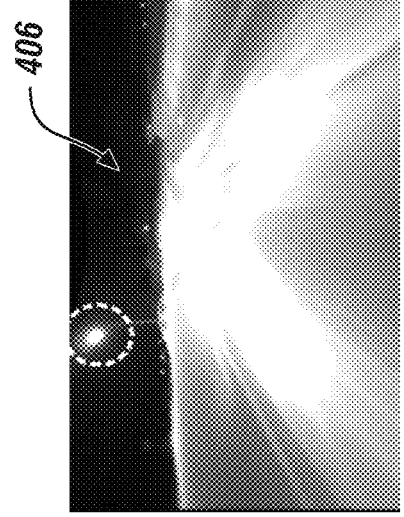
FIG. 4-4
FIG. 4-5
FIG. 4-6

METHOD AND APPARATUS FOR EVALUATING A VEHICLE TRAVEL SURFACE

INTRODUCTION

Vehicle control systems may benefit from information related to conditions of a travel surface. Differing conditions of the travel surface may affect coefficient of friction between the tires and the travel surface. By way of example, dry road surface conditions provide a high coefficient of friction, whereas snow-covered and icy road conditions provide a lower coefficient of friction. It is desirable for a vehicle to be able to determine the current condition of the travel surface, where the travel surface may be icy, wet, dry, snow-covered, etc., with the travel surface conditions being employed as inputs for controlling one or more systems such as braking, cornering and acceleration. In addition, travel surface conditions may be employed in travel path planning routines, whether on-vehicle or off-vehicle.

Travel surface details may be difficult to accurately and repeatedly discern using a camera due to varying ambient lighting and environmental lighting conditions because such variation affects appearances of travel surface images. The variation in the travel surface images under different lighting conditions can interfere with accurate detection of a particular road surface condition.

SUMMARY

A vehicle subsystem is described, and includes an on-vehicle camera that is disposed to monitor a field of view (FOV) that includes a travel surface for the vehicle. A controller is in communication with the on-vehicle camera and includes an instruction set that is executable to capture, via the on-vehicle camera, an image file associated with the FOV and segment the image file into a first set of regions associated with the travel surface and a second set of regions associated with an above-horizon portion. Image features on each of the first set of regions and the second set of regions are extracted and classified. A surface condition for the travel surface for the vehicle is identified based upon the classified extracted image features from each of the first set of regions and the second set of regions. Operation of the vehicle is controlled based upon the identified surface condition.

An aspect of the disclosure includes the instruction set being executable to compare the extracted image features from each of the first set of regions and the second set of regions with contents of a classifier database.

Another aspect of the disclosure includes the contents of the classifier database including a plurality of compiled feature sets and corresponding travel surface conditions.

Another aspect of the disclosure includes each of the plurality of compiled feature sets being extracted image features from each of the first set of regions and the second set of regions that have been predetermined for a predetermined one of the travel surface conditions.

Another aspect of the disclosure includes the image file being a plurality of pixels, wherein the image features include red-green-blue image features associated with each of the pixels.

Another aspect of the disclosure includes the instruction set being executable to dynamically capture, via the on-vehicle camera, the image file associated with the FOV.

Another aspect of the disclosure includes the instruction set being executable to assess a magnitude of ambient lighting, and identify the travel surface condition for the vehicle based upon the classified extracted image features from the first set of regions and the second set of regions and the magnitude of ambient lighting.

Another aspect of the disclosure includes the on-vehicle camera being a single on-vehicle camera.

Another aspect of the disclosure includes the instruction being executable to extract a first set of image features from each of the first set of regions and the second set of regions employing a night-time feature extraction routine, extract a second set of image features from each of the first set of regions and the second set of regions employing a day-time feature extraction routine, concatenate the extracted first and second sets of image features to generate a third set of extracted image features; and classify the third set of extracted image features from each of the first set of regions and the second set of regions.

Another aspect of the disclosure includes a method for monitoring, via a camera in communication with a controller, a field of view (FOV) that includes a travel surface. The method includes capturing, via the camera, an image file associated with the FOV, and communicating the image file to the controller. The method also includes segmenting the image file into a first set of regions associated with the travel surface and a second set of regions associated with an above-horizon portion, extracting image features on each of the first set of regions and the second set of regions, classifying the extracted image features from each of the first set of regions and the second set of regions, identifying a surface condition for the travel surface based upon the classified extracted image features from the first set of regions and the second set of regions, wherein the surface condition comprises one of a dry state, a wet state, an iced state and a snow-covered state; and communicating the identified surface condition for the travel surface to an infrastructure monitoring device.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 2 schematically shows a night-time travel surface condition detection process for dynamically evaluating image files that are captured by the camera to detect travel surface conditions for the vehicle at night under a range of environmental lighting conditions, in accordance with the disclosure;

FIG. 3-1 pictorially depicts an example pre-processed image file that has been captured by the camera of the vehicle that is described with regard to FIG. 1; in accordance with the disclosure;

FIG. 3-2 pictorially depicts the pre-processed image file shown with reference to FIG. 3-1 that has been partitioned into an upper region and a lower region with a line of demarcation being defined by a horizon, in accordance with the disclosure;

FIG. 3-3 pictorially depicts the pre-processed image file shown with reference to FIG. 3-1 that has been partitioned into an upper region and a lower region with a first line of demarcation that is defined by the horizon, and further partitioned into left and right regions by a vertical line of demarcation that is centrally disposed, in accordance with the disclosure;

FIG. 3-4 pictorially depicts the pre-processed image file shown with reference to FIG. 3-1 that has been partitioned into an upper region and a lower region with a first line of demarcation that is defined by the horizon, and further partitioned into left, center and right regions by two vertical lines of demarcation, in accordance with the disclosure;

FIGS. 4-1 through 4-6 pictorially depict image files of different travel surfaces at night-time, with various illumination sources and various travel surface conditions, in accordance with the disclosure;

FIG. 5 schematically shows a travel surface condition detection process for dynamically evaluating image files that are captured by the camera to detect travel surface conditions for the vehicle to detect travel surface conditions under a range of ambient lighting conditions and environmental lighting conditions, including daytime, dusk, nighttime and dawn, in accordance with the disclosure; and FIG. 6 schematically shows another embodiment of a travel surface condition detection process that may be executed via the vision system on the vehicle that is described with reference to FIG. 1, employing the luminance level from the ambient light sensor and other indicators of ambient lighting, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The term 'model' refers to a processor-based or processor-executable code and associated calibration that simulates a physical existence of a device or a physical process. As used herein, the terms 'dynamic' and 'dynamically' and related terms describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 1:
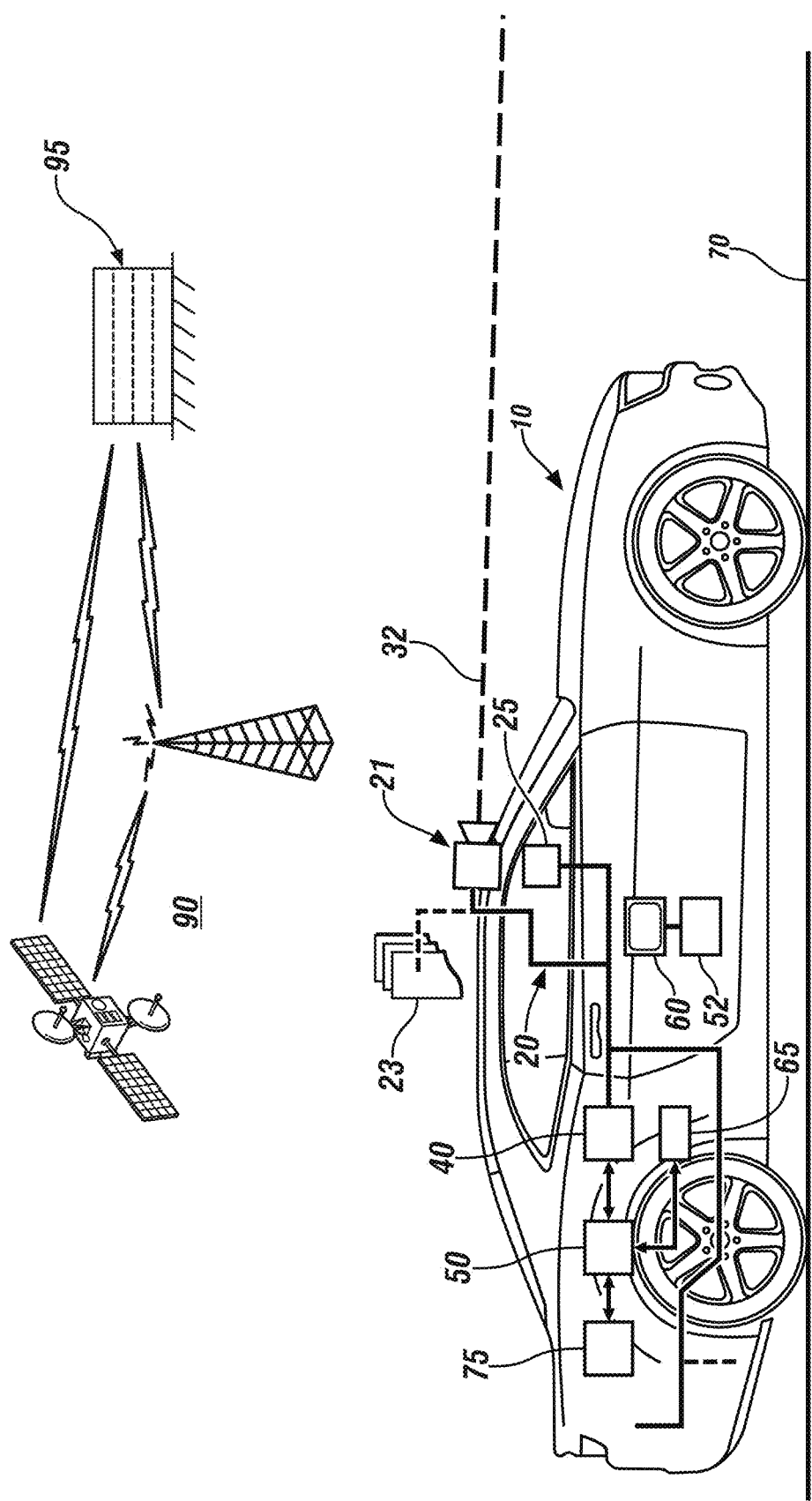
FIG. 1 schematically illustrates a side-view of a vehicle including an on-vehicle vision system, wherein the vehicle is disposed on a travel surface, in accordance with the disclosure.

Referring to the drawings, wherein like reference numerals correspond to like or similar components throughout the several Figures, FIG. 1, consistent with embodiments disclosed herein, schematically illustrates a side-view of a vehicle 10 including an on-vehicle vision system 20, wherein the vehicle 10 is disposed on and able to traverse a travel surface 70 such as a paved road surface. The vehicle 10 includes an on-vehicle vision system 20, a vehicle controller 50, a human/machine interface (HMI) device 60, and in one embodiment an autonomous controller 65 and a telematics controller 75. The vehicle 10 may include an ambient light sensor 25, which is disposed such that it is able to sense luminance of the ambient light incident to the vehicle 10. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

Ambient light and ambient lighting conditions refer to natural lighting conditions that originate with the sun. The ambient lighting conditions vary according to the position of the sun and the presence or absence of cloud cover, etc., and includes periods such as nighttime, dawn, dusk and daytime. Environmental lighting conditions refer to lighting and illumination that are generated by vehicle lamps and fixtures such as street lamps, buildings, etc. Travel surface conditions include, by way of example, a dry surface, a wet surface, a snow-covered surface, an icy surface, etc.

The vision system 20 is composed of one or more image detectors (cameras) that are in communication with a camera controller 40, including a camera 21. Camera 21 is advantageously mounted and positioned on the vehicle 10 in a location that permits capturing images of a field-of-view (FOV), wherein at least a portion of the FOV includes an aspect of the travel surface 70 that is forward of the vehicle 10. The FOV may also include a surrounding environment, including, e.g., vehicle traffic, roadside objects and other features, the sky and a horizon. The sky and horizon may provide an indication of ambient lighting.

The camera controller 40 is advantageously deployed to evaluate the travel surface 70 of the vehicle 10 by dynamically capturing and analyzing image files from the camera 21 that include some portion of the travel surface 70 and also capture the ambient lighting, such as may be provided through an image of the sky. The image files are associated with the FOV of the camera 21 wherein at least a portion of each of the plurality of FOV includes some portion of the travel surface 70.

As shown, the camera 21 can be disposed on a forward portion of the vehicle 10 to monitor a FOV 32 that is in front of the vehicle 10, thus capturing images that include the lane of travel and on-coming traffic forward of the vehicle 10. Other cameras (not shown) may also be employed, including, e.g., a second camera that is disposed on a rear portion of the vehicle 10 to monitor a FOV that is rearward of the vehicle 10, thus capturing images that include the lane of travel and, traffic that is behind the vehicle 10. Another camera may be disposed on a side portion of the vehicle 10 to monitor a FOV that is on one of the right or left sides of the vehicle 10, thus capturing images that include one side-view of the vehicle 10. Other cameras may be disposed elsewhere on the vehicle 10, and one or more of the cameras may be configured to monitor multiple FOVs employing lens configurations such as a fisheye lens, or employing rotating or pivoting arrangements. As appreciated, the quantity of the cameras disposed on-vehicle to monitor frontward, rearward and side FOVs is selectable, with information therefrom being fusible to monitor the FOV 32. Alternatively, the camera 21 may be disposed on a stationary fixture, such as on private property, e.g., on a garage at a private dwelling place, or on a public facility such as on a light pole, traffic lamp, or on an outside surface of a public building, and the vision system 20 may be disposed to communicate information extracted from images captured by the camera 21 to an infrastructure monitor, e.g., a traffic camera.

The vision system 20 may be composed of the camera 21 that is in communication with the camera controller 40. The FOV 32 of the camera 21 includes the travel surface, the surrounding environment, including, e.g., vehicle traffic, roadside objects and other features, and the sky. The camera 21 includes a lens and an image acquisition sensor that is capable of capturing, processing and electronically storing image files of the associated FOV, and communicating the image files to the camera controller 40 for storage and analysis. The lens of the camera 21 may be configured to include features such as a pin-hole lens, a fisheye lens, a stereo lens, a telescopic lens, etc. The image acquisition sensor may include an infrared detector, etc.

The camera 21 periodically captures an image file 23 associated with the FOV 32 at a desired rate, e.g., 30 image files per second. Each image file 23 is a digital representation of the FOV 32 that is captured at an original resolution of the camera 21. In one embodiment, the image file 23 is in the form of a 24-bit image including RGB (red-green-blue) visible light spectrum values and depth values that represent the FOV 32. Other embodiments of the image file 23 can include either a 2D or 3D image at some level of resolution depicting a black-and-white or a grayscale visible light spectrum representation of the FOV 32, an infrared spectrum representation of the FOV 32, or other image representations without limitation. The image representations of the plurality of image files 23 can be evaluated for parameters related to brightness and/or luminance in one embodiment. Alternatively, the image representations may be evaluated based upon RGB color components, brightness, texture, contour, or combinations thereof. The image acquisition sensor communicates with an encoder, which executes digital signal processing (DSP) on each image file. The image acquisition sensor of the camera 21 may be configured to capture the image at a nominally standard-definition resolution, e.g., 640×480 pixels. Alternatively, the image acquisition sensor of the camera 21 may be configured to capture the image at a nominally high-definition resolution, e.g., 1440×1024 pixels, or at another suitable resolution. The image acquisition sensor of the camera 21 may capture still images, or alternatively, digital video images at a predetermined rate of image capture. The image files 23 are communicated to the camera controller 40 as encoded datafiles that are stored in a non-transitory digital data storage medium in one embodiment for on-board or off-board analysis.

The vehicle 10 may be equipped with an autonomous controller 65 that implements autonomous vehicle functionalities in one embodiment. The autonomous controller 65 is configured to effect autonomous vehicle operation. Autonomous vehicle functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 65 independently from an action by the vehicle operator and in response to an autonomous control function.

Operator controls can be included in the passenger compartment of the vehicle 10 and may include, by way of non-limiting examples, a steering wheel, an accelerator pedal, the brake pedal and an operator input device that is an element of the HMI device 60. The operator controls enable a vehicle operator to interact with and direct operation of the vehicle 10 in functioning to provide passenger transportation. The operator control devices including the steering wheel, accelerator pedal, brake pedal, transmission range selector and the like may be omitted in some embodiments of the vehicle 10.

The HMI device 60 provides for human/machine interaction, for purposes of directing operation of an infotainment system, a global position sensor (GPS) 52, a navigation system and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems. The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI device 60. The HUD may project information that is reflected onto an interior side of a windshield of the vehicle, in the field-of-view of the operator, including transmitting a confidence level associated with operating one of the autonomic vehicle control systems. The HUD may also provide augmented reality information, such as lane location, vehicle path, directional and/or navigational information, and the like.

The vehicle 10 may include a telematics controller 75, which includes a wireless telematics communication system capable of extra-vehicle communications, including communicating with a communication network 90 having wireless and wired communication capabilities. The telematics controller 75 is capable of extra-vehicle communications that includes short-range vehicle-to-vehicle (V2V) communication and/or vehicle-to-infrastructure (V2x) communication, which may include communication with an infrastructure monitor, e.g., a traffic camera. Alternatively or in addition, the telematics controller 75 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller 75, and the handheld device executes the extra-vehicle communication, including communicating with an off-board controller 95 via the communication network 90. Alternatively or in addition, the telematics controller 75 executes the extra-vehicle communication directly by communicating with the off-board controller 95 via the communication network 90.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

Figures 1, 3:
Figures 2, 3:
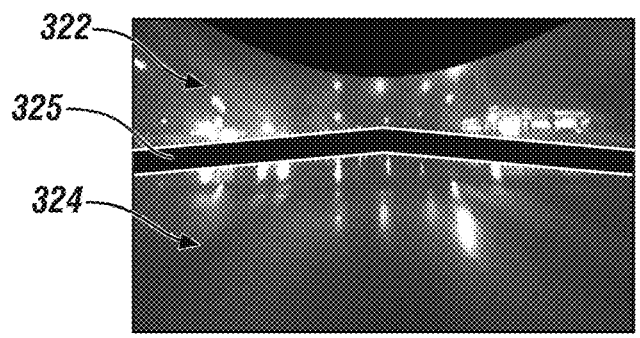
Figure 3:
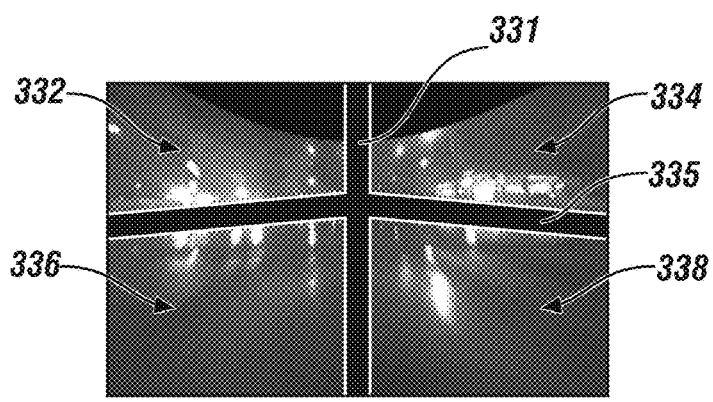

FIG. 2 schematically shows a night-time travel surface condition detection process 100, which is executable as one or a plurality of control routines in the vehicle controller 50 and/or the camera controller 40 to dynamically evaluate a plurality of image files 23 that are captured by the camera 21 to detect travel surface conditions for the vehicle 10 at night under a range of environmental lighting conditions.

The night-time travel surface condition detection process 100 actively monitors and incorporates sources of environmental lighting and their surface projection patterns and effects into an image analysis process to identify a travel surface condition, which can be communicated to a vehicle operator or the autonomous controller 65 to effect autonomous vehicle operation in accordance therewith. The night-time travel surface condition detection process 100 includes a dynamically-executed travel surface condition detection routine 110 and a training routine 160, which may be executed off-line.

The training routine 160 is configured to evaluate image files contained in a training dataset 155, and includes steps of pre-processing 165, region of interest (ROI) extraction 170, feature extraction 180, feature compilation 190, and classifier training 195.

The training dataset 155 includes a plurality of image files that depict travel surfaces having a variety of travel surface conditions that are exposed to a variety of environmental lighting conditions, which may be captured in a FOV of an embodiment of the vision system 20 composed of the camera 21 in communication with the camera controller 40, as described with reference to FIG. 1. The travel surfaces may include, by way of example, an asphalt-based surface, a concrete-based surface, a gravel surface, a composite surface, etc. The travel surface conditions advantageously include, by way of example, a dry surface, a wet surface, a snow-covered surface, an icy surface, etc. The environmental lighting conditions include, by way of example, headlamp-only lighting, headlamp lighting in combination with a plurality of street-lamps, headlamp lighting in combination with a plurality of street-lamps and a range of storefront and advertising lighting fixtures having a range of luminances. The environmental lighting conditions may be characterized by their combined luminances. Each image file of the training dataset 155 is subjected to the pre-processing step 165, which includes noise filtering, downsizing, cropping, image re-projection and other steps to compress the image file data for further processing. The pre-processed image file is subjected to the ROI extraction step 170, which includes partitioning the pre-processed image file.

Figures 3, 4:
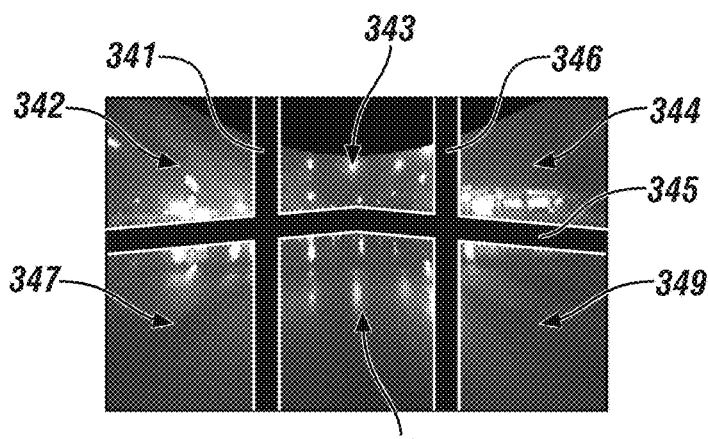

FIG. 3-1 pictorially depicts an example pre-processed image file 310, captured in a FOV of an embodiment of the vision system 20 composed of the camera 21 in communication with the camera controller 40 for the vehicle 10 described with reference to FIG. 1. The example pre-processed image file 310 depicts a travel surface. FIGS. 3-2, 3-3 and 3-4 pictorially depict a result of the ROI extraction step 170 to partition the example pre-processed image file 310 shown with reference to FIG. 3-1. As shown, the FOV shown in the pre-processed image file 310 includes a wet road surface that includes environmental light that is emanating from street lamps, oncoming vehicles and a commercial storefront building. The example pre-processed image file 310 is shown in an unpartitioned state, i.e., prior to or without the ROI extraction step 170. FIG. 3-2 pictorially depicts the example pre-processed image file 310 that has been partitioned into an upper region 322 and a lower region 324 with a line of demarcation 325 being defined by a horizon. As such, the upper region 322 contains the portion of the pre-processed image file 310 that represents above the horizon and the lower region contains the portion of the pre-processed image file 310 that represents the travel surface.

FIG. 3-3 pictorially depicts the example of the pre-processed image file 310 that has been partitioned into an upper region and a lower region with a first line of demarcation 335 that is defined by the horizon and a second vertical line of demarcation 331 that is centrally disposed. In this embodiment of the ROI extraction step 170, the upper region and the lower region are divided into left and right portions, resulting in an upper left region 332, an upper right region 334, a lower left region 336, and a lower right region 338. As such, the upper left and right regions 332, 334 contain portions of the pre-processed image file 310 that represent above the horizon and the lower left and right regions 336, 338 contain portions of the pre-processed image file 310 that represent the travel surface.

FIG. 3-4 pictorially depicts the example of the pre-processed image file 310 that has been partitioned into an upper region and a lower region with a first line of demarcation 345 that is defined by the horizon two vertical lines of demarcation 341 and 346, respectively. In this embodiment of the ROI extraction step 170, the upper region and the lower region are divided into left, center and right portions, resulting in an upper left region 342, an upper center region, 343 and an upper right region 344, a lower left region 347, a lower center region 348 and a lower right region 349. As such, the upper left, center and right regions 342, 343, 344 contain portions of the pre-processed image file 310 that represent above the horizon and the lower left, center and right regions 347, 348 and 349 contain portions of the pre-processed image file 310 that represent the travel surface.

Referring again to FIG. 2, the feature extraction step 180 includes a first step 182 to extract features associated with environmental light, i.e., light that is emanating from sources that are above the horizon, such as is depicted in the upper regions defined with reference to FIGS. 3-1 to 3-4. The environmental light emanates from street lamps and other fixtures, and from headlamps of oncoming vehicles. The feature extraction step 180 also includes a second step 184 to extract features associated with the projection of environmental light onto a travel surface, such as is depicted in the lower regions defined with reference to FIGS. 3-1 to 3-4. The first step 182 of feature extraction 180 advantageously evaluates at least one of the upper region(s) is to determine environmental illumination. The second step 184 of feature extraction 180 advantageously evaluates at least one of the lower region(s) to determine travel surface conditions.

The feature extraction step 180 includes a pixel-by-pixel evaluation of light intensity in each of the regions. When the image file 23 is in the form of a 24-bit image including RGB (red-green-blue) visible light spectrum values and depth values that represent the associated FOV, each pixel has values associated with red, green and blue colors, and features can be defined in terms of a sum of intensities in the region in each of the red, green and blue colors. Alternatively, the image file 23 may be composed of pixels having another set of light and depth values, including, e.g., grayscale, black and white, infrared, ultraviolet, etc.

When each pixel has values associated with red, green and blue colors, and features can be defined in terms of a sum of intensities in the region in each of the red, green and blue colors, which may be represented by the following EQS. 1-6. Referring to FIG. 3-2, feature extraction can include compiling information from pixels that are associated with the upper region, i.e., associated with the environmental light above the horizon, in accordance with EQS. 1-3, as follows:

$$\text{Feature}^1 = \Sigma_{i \in N_x}{}^{ROI1} \Sigma_{j \in N_y}{}^{ROI1} [\alpha I_r(i,j)] \qquad [1]$$

$$\text{Feature}^2 = \Sigma_{i \in N_x}{}^{ROI1} \Sigma_{j \in N_y}{}^{ROI1} [\alpha I_g(i,j)] \qquad [2]$$

$$\text{Feature}^3 = \Sigma_{i \in N_x}{}^{ROI1} \Sigma_{j \in N_y}{}^{ROI1} [\alpha I_b(i,j)] \qquad [3]$$

wherein $I_r$ represents magnitude of pixel intensity in the red spectrum, $I_g$ represents magnitude of pixel intensity in the green spectrum, $I_b$ represents magnitude of pixel intensity in the blue spectrum, x represents an x-axis pixel location in the ROI, y represents a y-axis pixel location in the ROI, and $\alpha$ is a scalar value associated with a threshold intensity that is determined based upon training data analysis.

Feature extraction can include compiling information from pixels that are associated with the lower region, i.e., associated with projection of the environmental light onto the travel surface, in accordance with EQS. 4-6, as follows:

$$\text{Feature}^4 = \Sigma_{i \in N_x}{}^{ROI2} \Sigma_{j \in N_y}{}^{ROI2} [\alpha I_r(i,j)] \qquad [4]$$

$$\text{Feature}^5 = \Sigma_{i \in N_x}{}^{ROI2} \Sigma_{j \in N_y}{}^{ROI2} [\alpha I_g(i,j)] \qquad [5]$$

$$\text{Feature}^6 = \Sigma_{i \in N_x}{}^{ROI2} \Sigma_{j \in N_y}{}^{ROI2} [\alpha I_b(i,j)] \qquad [6]$$

In one embodiment, only those pixel values that are greater than a threshold intensity are used in calculation of the features. By way of a non-limiting example, only those pixel values that are greater than a threshold intensity of 50% may be used in calculation of the features, and those pixel values that are less than a threshold intensity of 50% are omitted from the calculation of the features. Alternatively, only those pixel values that are greater than a threshold intensity of 25% may be used in calculation of the features. Alternatively only those pixel values that are greater than another threshold intensity may be used in calculation of the features, wherein the threshold intensity is selected and calibrated based upon in-use testing and/or evaluation.

The extracted features from the feature extraction step 180 are employed in the feature compilation step 190, which compiles all the features for all of the upper and lower regions of the specific image file into a feature set. The compiled feature sets for all of the upper and lower regions of the image file are provided as input to the classifier training step 195, which correlates the compiled feature set for the specific image file with the associated travel surface having a specific travel surface condition that is exposed to a specific environmental lighting condition. The classifier training step 195 develops the compiled feature set for each of the image files of the training dataset 155. A classifier database 200 is generated by the training routine 160, and includes the compiled feature sets and the corresponding travel surface conditions and environmental lighting conditions. The training routine 160 may be executed off-line, with the classifier database 200 being stored in a memory device in the controller 40 in the vehicle 10, or alternatively stored in a memory device at a remote site such as the off-board controller 95. The classifier database 200 can be interrogated by the travel surface condition detection routine 110.

By way of example, when the travel surface condition is a wet surface, headlights will be reflected away on the travel surface and other environmental illumination will be vertically projected onto the travel surface at the same color. As such, a sum of intensities of the lower region indicated by the features that may be determined by EQS. 1, 2 and 3 will be strongly correlated to the sum of intensities of the corresponding upper region as indicated by the features determined by EQS. 4, 5 and 6.

By way of example, when the travel surface condition is a snow surface, the headlight will be subjected to subsurface scattering on the travel surface, making the travel surface very bright. As such, the sum of intensities of the lower region indicated by the features that may be determined by EQS. 1, 2 and 3 will be substantially greater than the sum of intensities of the corresponding upper region as indicated by the features determined by EQS. 4, 5 and 6.

By way of example, when the travel surface condition is a dry surface, a light condition that includes only vehicle headlights will be scattered on the travel surface due to light diffusion. As such, the sum of the intensities of the lower region indicated by the features that may be determined by EQS. 1, 2 and 3 will be in-between of those associated with the wet surface and with the snow surface for the corresponding upper region as indicated by the features determined by EQS. 4, 5 and 6.

Referring again to FIG. 2, the night-time travel surface condition detection process 100 includes processing an image file 23 that is captured in real-time employing the steps of pre-processing 115, region of interest (ROI) extraction 120, night-time feature extraction 130, feature compilation 140, and classification 145. The outcome of the travel surface condition detection routine 110 includes a dynamic detection and identification of a travel surface condition 150 that can be associated with the image file 23. The travel surface condition 150 is advantageously communicated to the vehicle controller 50 and/or the autonomous controller 65. The steps of pre-processing 115, ROI extraction 120, night-time feature extraction 130, and feature compilation 140 are analogous to the corresponding steps of pre-processing 165, region of interest (ROI) extraction 170, feature extraction 180, and feature compilation 190 that are executed by the training routine 160. The foregoing steps 115, 120, 130, and 140 execute in real-time to dynamically evaluate the image file 23 to detect and identify the travel surface condition 150.

The night-time feature extraction 130 includes a first step 132 to extract features associated with environmental light, employing EQS. 1, 2 and 3. The environmental light emanates from street lamps and other fixtures, and from oncoming vehicles. The feature extraction step 180 also includes a second step 184 to extract features associated with the projection of environmental light onto a travel surface, employing EQS. 4, 5 and 6.

The classification step 145 involves executing a comparison between the output of the feature compilation step 140 and the contents of the classifier database 200 to dynamically determine the travel surface condition 150. The comparison between the output of the feature compilation step 140 and the contents of the classifier database 200 involves identifying which of the compiled feature sets contained in the classifier database 200 most closely resembles the output of the feature compilation step 140, and identifying the corresponding travel surface conditions and environmental lighting conditions based thereon. The travel surface condition 150 can be, by way of non-limiting examples, a dry state, a wet state, an ice state, or a snow-covered state. The travel surface condition 150 may be communicated to the vehicle controller 50, which may employ the travel surface condition 150 in vehicle dynamic control related to acceleration, braking and cornering, including control related to an adaptive cruise control system. The travel surface condition 150 may also be communicated to the vehicle operator via the HMI device 60. The travel surface condition may also be communicated to the telematics controller 75 for short-range vehicle-to-vehicle (V2V) communication, communication to an intelligent highway system, or communication to another extra-vehicle system.

FIGS. 4-1 through 4-6 pictorially depict image files of examples of travel surfaces at night-time, with various illumination sources and various travel surface conditions. The image files are captured in a FOV of an embodiment of the vision system 20 composed of the camera 21 in communication with the camera controller 40 for the vehicle 10 described with reference to FIG. 1. Travel surface conditions may be difficult to see or otherwise discern at night due to the lack of ambient lighting. Furthermore, travel surface conditions affect light diffusion, absorption, reflection and scattering, and uncertainty and variation of environmental illumination significantly affect surface image appearance. At night, environmental illumination sources project different patterns on different travel surface conditions. Illumination and illumination projection of vehicle headlamps and other environmental illumination sources onto a travel surface show different degrees of correlation on different road surface conditions.

FIG. 4-1 pictorially depicts an image file 401 of a dry travel surface at night-time that is illuminated only by headlamps of the subject vehicle. The travel surface lighting is a relatively bright and diffuse.

FIG. 4-2 pictorially depicts an image file 402 of a wet travel surface at night-time that is illuminated only by headlamps of the subject vehicle. The travel surface lighting is a relatively dark, as compared to the image file 401 of the dry travel surface that is shown with reference to FIG. 4-1, with light being reflected away from the vehicle.

FIG. 4-3 pictorially depicts an image file 403 of a snow-covered travel surface at night-time that is illuminated only by headlamps of the subject vehicle. The travel surface lighting is relatively brighter, as compared to the image file 401 of the dry travel surface that is shown with reference to FIG. 4-1, with light being scattered in multiple directions.

FIG. 4-4 pictorially depicts an image file 404 of a dry travel surface at night-time that is illuminated by headlamps of the subject vehicle and with other environmental lighting sources. The travel surface lighting is relatively bright and diffuse, with the other environmental lighting sources being diffused.

Figure 5:
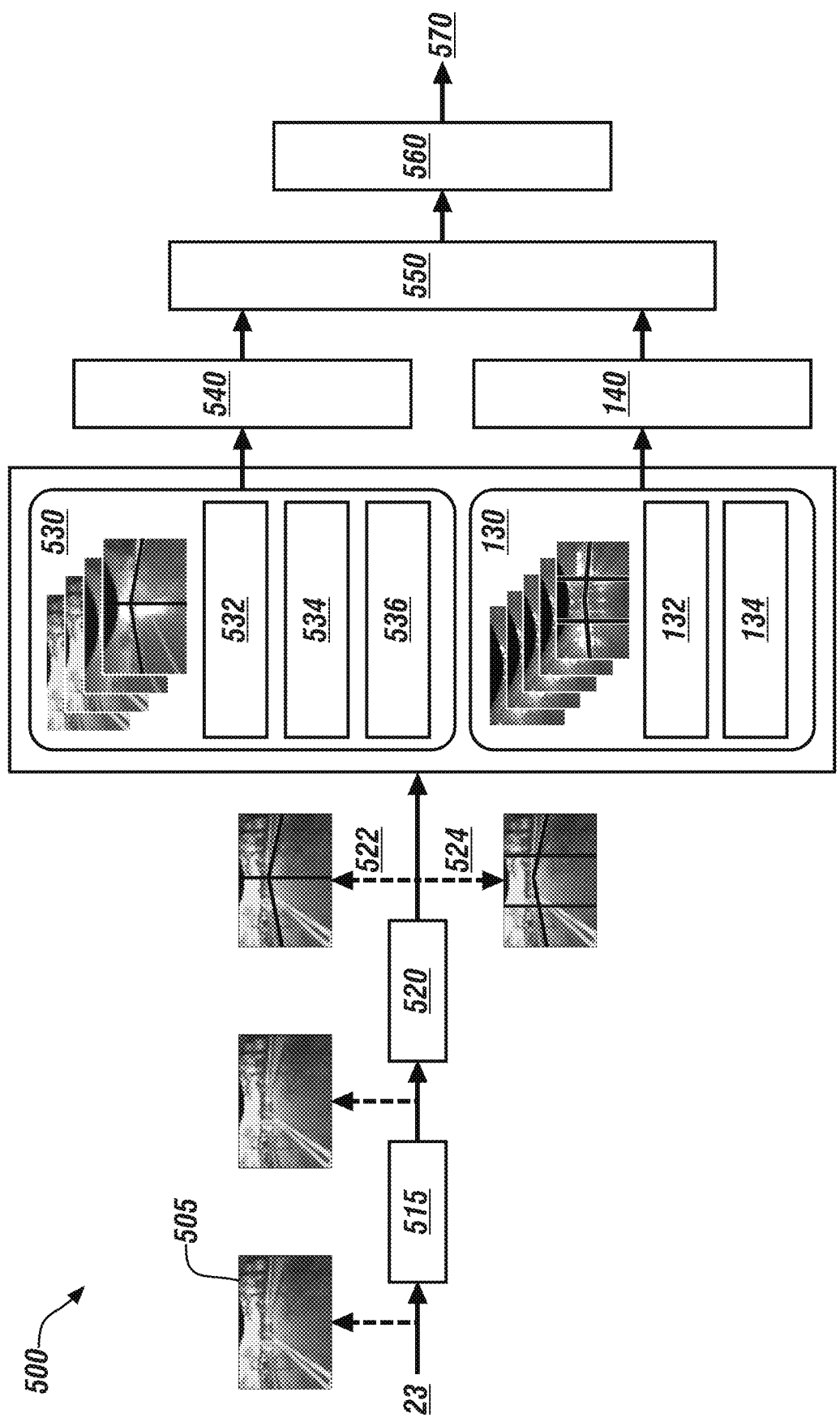

FIG. 4-5 pictorially depicts an image file 405 of a set travel surface at night-time that is illuminated by headlamps of the subject vehicle and with other environmental lighting sources. The travel surface lighting includes the other environmental lighting sources being reflected onto the travel surface, with proportionally-sized vertically projected images of the other environmental lighting sources being reflected onto the wet surface.

Figure 6:
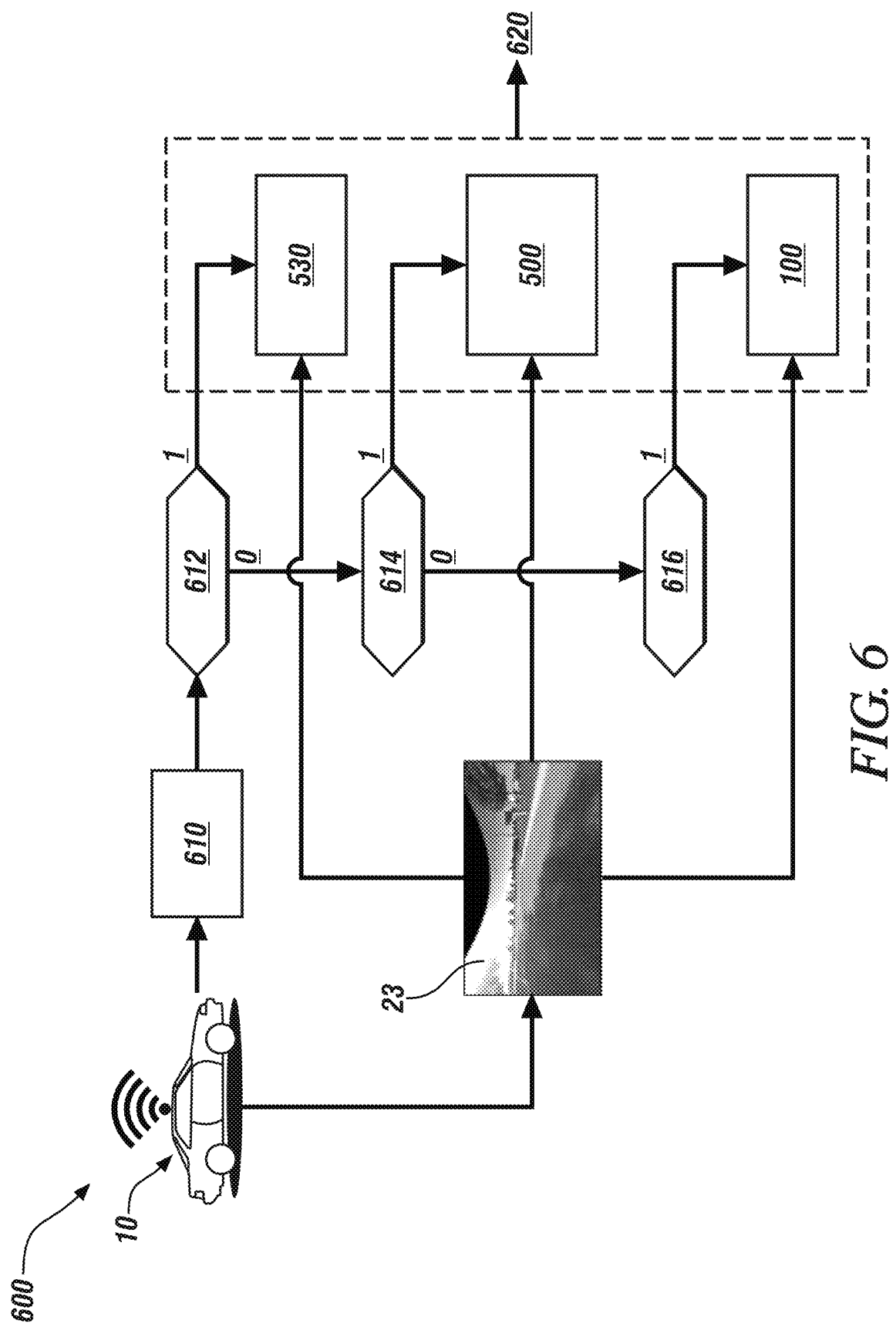

FIG. 4-6 pictorially depicts an image file 406 of a snow-covered travel surface at night-time that is illuminated by headlamps of the subject vehicle and with other environmental lighting sources. The travel surface lighting is relatively brighter, as compared to the image file 404 of the dry travel surface that is shown with reference to FIG. 4-4, with light being diffused. There is no clear projection of the environmental lighting.

Each of the image files 401 through 406 has image features that include uniquely identifiable illumination characteristics that can be quantified and otherwise parameterized to form a compiled feature set, which can be stored in the classifier database 200 that is described with regard to FIG. 2. By way of example, the image features including the identifiable illumination characteristics can be quantified and otherwise parameterized employing the feature extraction step 180 of FIG. 2 that includes EQS. 1-6. The compiled feature sets can be reduced to algorithmic code as part of the training routine 160.

FIG. 5 schematically shows another embodiment of a travel surface condition detection process 500 that may be executed via the vision system 20 on the vehicle 10 that is described with reference to FIG. 1. The travel surface condition detection process 500 may be executed as one or a plurality of control routines in the vehicle controller 50 and/or the camera controller 40 to dynamically evaluate image files 23 that are captured by the camera 21 to detect travel surface conditions under a range of ambient lighting conditions and environmental lighting conditions, including ambient lighting conditions that include daytime, nighttime, and transition times that include dusk and dawn. The travel surface condition detection process 500 is adaptable to detect travel surface conditions under a range of lighting conditions through feature-level fusion.

An image file 23 of the FOV is periodically captured by the camera 21 for evaluation. Each image file 23 is subjected to pre-processing 515 and ROI extraction 520. The pre-processing step 515 is analogous to the pre-processing 115 described with reference to FIG. 2. The ROI extraction step 520 includes two elements, including executing a first extraction to partition the pre-processed image file 310 into a first partitioned image 522, and executing a second extraction to partition the pre-processed image file 310 into a second partitioned image 524. The first and second partitioned images 522 and 524 may have the same image resolution in one embodiment. In one embodiment, the second partitioned image 524 has a greater quantity of ROI regions than the first partitioned image 522, such as to be able to extract better light and surface projection proportion property for night scenarios. By way of a non-limiting example, the second partitioned image 524 is partitioned into an upper region and a lower region, each which is divided into left, center and right portions, resulting in an upper left region, an upper center region, and an upper right region, a lower left region, a lower center region and a lower right region. By way of a non-limiting example, the first partitioned image 522 is partitioned into an upper region and a lower region, each which is divided into left and right portions, resulting in an upper left region, an upper right region, a lower left region, and a lower right region. In both the first partitioned image 522 and the second partitioned image 524, the upper regions contain portions of the pre-processed image file 505 that represent above the horizon and the lower regions contain portions of the pre-processed image file 505 that represent the travel surface.

The first partitioned image 522 is input to a first feature extraction step 530, and the second partitioned image 524 is provided as input to a second feature extraction step, which is the night-time feature extraction step 130, which is part of the night-time travel surface condition detection process 100 that is described with reference to FIG. 2. The night-time feature extraction step 130 includes first step 132 to extract features associated with environmental light, employing EQS. 1, 2 and 3, and second step 134 to extract features associated with the projection of environmental light onto a travel surface, employing EQS. 4, 5 and 6, which both are communicated to the feature compilation step 140.

The first feature extraction step 530 is associated with feature extraction in daytime, and includes first step 532 to extract features associated with ambient light, and second step 534 to extract features associated with the projection of ambient light onto the travel surface. A third step 536 is executed to extract features associated with overall road surface conditions. The extracted features from the first feature extraction step 530 are communicated to a daytime feature compilation step 540. One embodiment of a daytime feature compilation step 540 includes a surface detection system for detecting surface conditions. The surface detection system includes an image scene captured by a camera wherein the image scene includes: a set of a plurality of regions of interest (ROIs), and a processor that is configured to receive the image scene to extract a first and a second ROI from the set of the plurality of ROIs of the image scene; associate the first ROI with an above-horizon region and associate the second ROI with a surface region, and analyze the first ROI and the second ROI in parallel for a condition related to an ambient lighting in the first ROI and for an effect related to the ambient lighting in the second ROI. Features of the condition of the ambient lighting can be extracted from the first ROI and features of the effect of the ambient lighting on a surface region can be extracted from the second ROI. Analyzing the second ROI to extract features of the effects of the ambient lighting on the surface region in common with features of the first ROI of the conditions of ambient lighting can based on a plurality of image attributes wherein the extracted features include a common set of features for both ROIs. The image attributes may include a set of one or more of a texture, a brightness and a color information. The surface detection system may also include generating one or more common sets of features from both ROIs by combining each common set of features with one or more of each image attribute. The surface detection system may also include classifying by a classifier each of the common set of features to a particular surface type. This may include determining by a threshold related to values of pixels of the first ROI features of the condition of the ambient lighting and thresholds related to values of pixels of the second ROI features of the effect of the ambient lighting on the surface region.

The compiled features from the daytime feature compilation step 540 and from the feature compilation step 140 are input to a concatenation step 550, which digitally combines the features employing a pixel-specific or feature-specific comparison, with the resultant communicated to a classification step 560. The concatenation step 550 employs extracted features of both the first feature extraction step 530 associated with feature extraction in daytime and the nighttime feature extraction step 130. The concatenation step 550 concatenates extracted features and generates a set of features that are input to the classification step 560, which is trained based on the concatenated features of both daytime and nighttime scenarios, employing an offline training process. Another classifier database based upon the concatenated features of both daytime and nighttime scenarios is generated off-line for use in a real-time classification process.

The classification step 560 involves executing a comparison between the output of the concatenation step 550 and the contents of the classifier database 200 (or the classifier database based upon the concatenated features of both daytime and nighttime scenarios) to determine the travel surface condition 570. The comparison between the output of the concatenation step 550 and the contents of the respective classifier database involves identifying which of the compiled feature sets contained in the respective classifier database most closely resembles the output of the concatenation step 550, and identifying the corresponding travel surface conditions and environmental lighting conditions based thereon.

FIG. 6 schematically shows another embodiment of a travel surface condition detection process 600 that may be executed via the vision system 20 on the vehicle 10 that is described with reference to FIG. 1, employing the luminance level from the ambient light sensor 25 and other indicators of ambient lighting, e.g., a time-of-day sensor, GPS/Mapping, and other inputs. The luminance level is linked with the image file 23. As employed herein, the term "1" indicates an answer in the affirmative, or "YES", and the term "0" indicates an answer in the negative, or "NO".

The luminance level from the ambient light sensor 25 is input to an ambient lighting assessment step 610 to determine a magnitude of the ambient lighting, i.e., the luminance level. When the luminance level of the ambient light is greater than a first threshold (612)(1), it indicates daytime, and the routine executes a daytime solution, i.e., the first feature extraction step 530 and daytime feature compilation step 540 described with reference to FIG. 5, to identify the state of the travel surface 620 for the image file 23.

When the luminance level of the ambient light is less than a second threshold, it indicates night-time (616)(1), and the routine executes a night-time solution, i.e., the night-time travel surface condition detection process 100 that is described with reference to FIG. 2 to identify the state of the travel surface 620 for the image file 23.

When the luminance level of the ambient light is less than the first threshold associated with daytime (612)(0) but greater than the second threshold associated with night-time (614)(1), the routine executes a third solution, i.e., the travel surface condition detection process 500 that is described with reference to FIG. 5 to identify the state of the travel surface 620 for the image file 23.

The travel surface condition detection process 600 has the advantage that the specific process for feature extraction is selected based upon the luminance level of the ambient light, thus reducing computation needs under different conditions. When it is daytime, daytime features are calculated without a need of calculating nighttime features, and vice-versa. When the ambient light is in transition, the process calculates the concatenated daytime and night features as described with reference to travel surface condition detection process 500 that is described with reference to FIG. 5 to identify the state of the travel surface 620 for the image file 23.

The block diagrams in the flow diagrams illustrate the architecture, functionality, and operation of possible implementations of systems, methods, and computer program products according to various embodiments of the present disclosure. In this regard, each block in the block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:
1. A vehicle subsystem, comprising:
an on-vehicle camera disposed to monitor a field of view (FOV) that includes a travel surface for the vehicle;
a controller, in communication with the on-vehicle camera, the controller including an instruction set, the instruction set executable to:
capture, via the on-vehicle camera, an image file associated with the FOV;
segment the image file into a first set of regions associated with the travel surface and a second set of regions associated with an above-horizon portion;
extract image features from each of the first set of regions and the second set of regions;
classify the extracted image features from each of the first set of regions and the second set of regions;
assess a magnitude of ambient lighting;
identify a travel surface condition for the vehicle based upon the classified extracted image features from the first set of regions and the second set of regions and the magnitude of ambient lighting; and
communicate the identified travel surface condition to a second controller.
2. The vehicle subsystem of claim 1, wherein the instruction set executable to classify the extracted image features from each of the first set of regions and the second set of regions comprises the instruction set being executable to compare the extracted image features from each of the first set of regions and the second set of regions with contents of a classifier database.

3. The vehicle subsystem of claim 2, wherein the contents of the classifier database comprises a plurality of compiled feature sets and corresponding plurality of travel surface conditions, and wherein each of the plurality of compiled feature sets comprises extracted image features from each of the first set of regions and the second set of regions that have been predetermined for a predetermined one of the travel surface conditions.

4. The subsystem of claim 1, wherein the image file comprises a plurality of pixels, and wherein the image features comprise one of texture, brightness or color attributes associated with the pixels.

5. The subsystem of claim 1, further comprising the instruction set being executable to:
  extract a first set of image features from each of the first set of regions and the second set of regions employing a night-time feature extraction routine;
  extract a second set of image features from each of the first set of regions and the second set of regions employing a day-time feature extraction routine;
  concatenate the extracted first and second sets of image features to generate a third set of extracted image features; and
  classify the third set of extracted image features from each of the first set of regions and the second set of regions.

6. The subsystem of claim 1, wherein the travel surface condition comprises one of a dry state, a wet state, an iced state and a snow-covered state.

7. The subsystem of claim 1, comprising the instruction set being executable to extract image features associated with environmental light from the first set of regions and executable to extract image features associated with projection of environmental light onto the travel surface from the second set of regions.

8. The subsystem of claim 7, wherein the instruction set being executable to extract image features associated with environmental light from the first set of regions comprises compiling information from pixels of a portion of the image file associated with the first set of regions.

9. The subsystem of claim 7, wherein the instruction set being executable to extract image features associated with projection of environmental light onto the travel surface from the second set of regions comprises the instruction set being executable to compile information from pixels of a portion of the image file associated with the second set of regions.

10. A method for controlling a vehicle including an on-vehicle camera disposed to monitor a field of view (FOV) that includes a travel surface for the vehicle, comprising:
  capturing, via the on-vehicle camera, an image file associated with the FOV;
  segmenting the image file into a first set of regions associated with the travel surface and a second set of regions associated with an above-horizon portion;
  extracting image features on each of the first set of regions and the second set of regions, including extracting a first set of image features from each of the first set of regions and the second set of regions employing a night-time feature extraction routine and extracting a second set of image features from each of the first set of regions and the second set of regions employing a day-time feature extraction routine;
  concatenating the extracted first and second sets of image features to generate a third set of extracted image features;
  classifying the third set of extracted image features from each of the first set of regions and the second set of regions;
  identifying a travel surface condition for the vehicle based upon the classified third set of extracted image features from each of the first set of regions and the second set of regions; and
  controlling operation of the vehicle based upon the identified travel surface condition.

11. The method of claim 10, further comprising extracting image features associated with environmental light from the first set of regions and extracting image features associated with projection of environmental light onto the travel surface from the second set of regions.

12. The method of claim 11, wherein extracting image features associated with environmental light from the first set of regions comprises compiling information from pixels of a portion of the image file associated with the first set of regions.

13. The method of claim 10, wherein classifying the extracted image features from each of the first set of regions and the second set of regions comprises comparing the extracted image features from each of the first set of regions and the second set of regions with contents of a classifier database.

14. The method of claim 10, wherein each of the plurality of compiled feature sets comprises extracted image features from each of the first set of regions and the second set of regions that have been predetermined for a predetermined one of the travel surface conditions.

15. A method for monitoring, via a camera in communication with a controller, a field of view (FOV) that includes a travel surface, comprising:
  capturing, via the camera, an image file associated with the FOV;
  communicating the image file to the controller;
  segmenting, via the controller, the image file into a first set of regions associated with the travel surface and a second set of regions associated with an above-horizon portion;
  extracting image features on each of the first set of regions and the second set of regions, including extracting a first set of image features from each of the first set of regions and the second set of regions employing a night-time feature extraction routine and extracting a second set of image features from each of the first set of regions and the second set of regions employing a day-time feature extraction routine;
  concatenating the extracted first and second sets of image features to generate a third set of extracted image features;
  classifying the third set of extracted image features from each of the first set of regions and the second set of regions;
  identifying a surface condition for the travel surface based upon the classified third set of extracted image features from each of the first set of regions and the second set of regions, wherein the surface condition includes one of a dry state, a wet state, an iced state and a snow-covered state; and
  communicating, via the controller, the identified surface condition for the travel surface to an infrastructure monitoring device.

16. The method of claim 15, further comprising extracting image features associated with environmental light from the first set of regions and extracting image features associated with projection of environmental light onto the travel surface from the second set of regions.

17. The method of claim 16, wherein extracting image features associated with environmental light from the first set of regions comprises compiling information from pixels of a portion of the image file associated with the first set of regions.

* * * * *